United States Patent
Kuo et al.

(10) Patent No.: US 11,436,483 B2
(45) Date of Patent: Sep. 6, 2022

(54) NEURAL NETWORK ENGINE WITH TILE-BASED EXECUTION

(71) Applicant: MediaTek Inc., Hsinchu (TW)

(72) Inventors: Yu-Ting Kuo, Hsinchu (TW); Chien-Hung Lin, Hsinchu (TW); Shao-Yu Wang, Hsinchu (TW); ShengJe Hung, Hsinchu (TW); Meng-Hsuan Cheng, Hsinchu (TW); Chi-Ta Wu, Hsinchu (TW); Henry Andrian, Hsinchu (TW); Yi-Siou Chen, Hsinchu (TW); Tai-Lung Chen, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 907 days.

(21) Appl. No.: 16/246,884

(22) Filed: Jan. 14, 2019

(65) Prior Publication Data
US 2019/0220742 A1    Jul. 18, 2019

Related U.S. Application Data

(60) Provisional application No. 62/621,614, filed on Jan. 25, 2018, provisional application No. 62/618,102, filed on Jan. 17, 2018.

(51) Int. Cl.
| | |
|---|---|
| *G06N 3/08* | (2006.01) |
| *G06N 3/04* | (2006.01) |
| *G06N 3/063* | (2006.01) |
| *G06F 12/084* | (2016.01) |
| *G06F 17/15* | (2006.01) |

(52) U.S. Cl.
CPC ............ *G06N 3/08* (2013.01); *G06F 12/084* (2013.01); *G06F 17/15* (2013.01); *G06N 3/0454* (2013.01); *G06N 3/063* (2013.01); *G06N 3/04* (2013.01)

(58) Field of Classification Search
None
See application file for complete search history.

(56) References Cited

U.S. PATENT DOCUMENTS

| | | |
|---|---|---|
| 2017/0244949 A1 | 8/2017 | Peterson |
| 2018/0011866 A1 | 1/2018 | Bowman et al. |
| 2018/0189635 A1* | 7/2018 | Olarig .................. G06N 3/0481 |
| 2018/0253402 A1* | 9/2018 | Redfern ................ G06F 17/141 |
| 2019/0094027 A1* | 3/2019 | Xu ............................ G06N 3/04 |

* cited by examiner

*Primary Examiner* — Craig C Dorais
(74) *Attorney, Agent, or Firm* — Tong J. Lee

(57) ABSTRACT

An accelerator for neural network computing includes hardware engines and a buffer memory. The hardware engines include a convolution engine and at least a second engine. Each hardware engine includes circuitry to perform neural network operations. The buffer memory stores a first input tile and a second input tile of an input feature map. The second input tile overlaps with the first input tile in the buffer memory. The convolution engine is operative to retrieve the first input tile from the buffer memory, perform convolution operations on the first input tile to generate an intermediate tile of an intermediate feature map, and pass the intermediate tile to the second engine via the buffer memory.

22 Claims, 8 Drawing Sheets

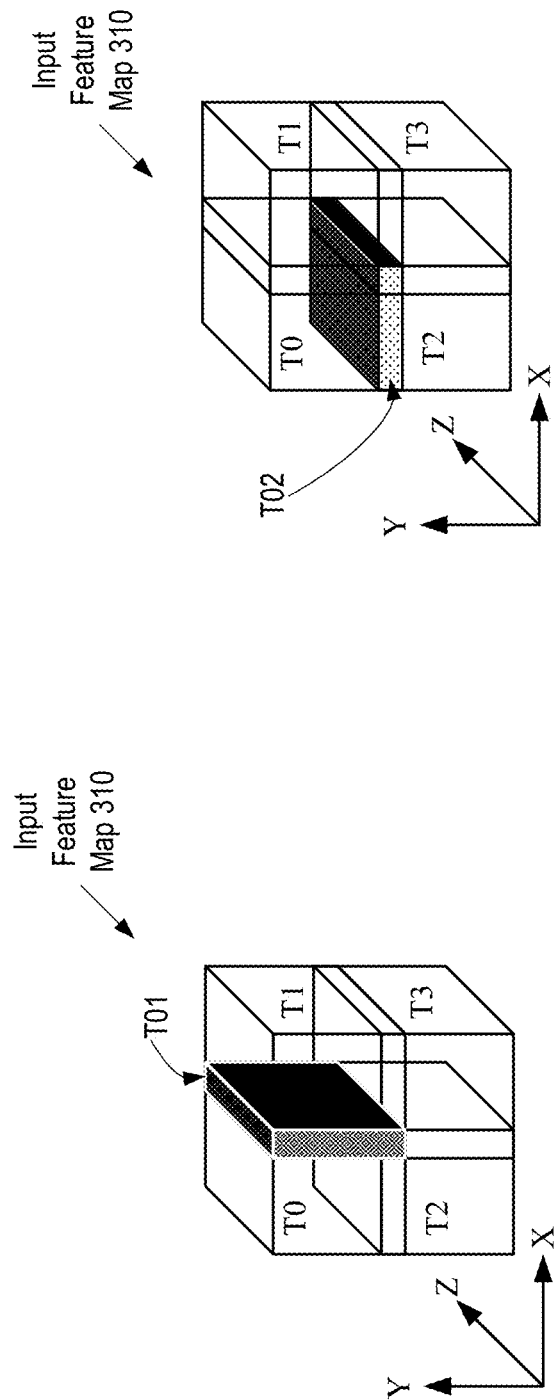

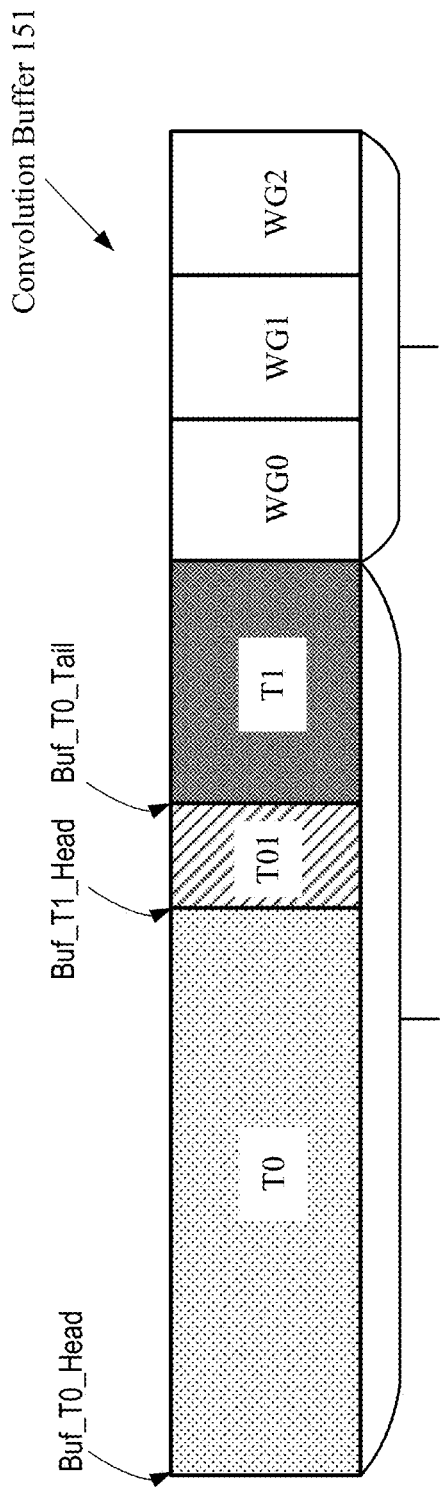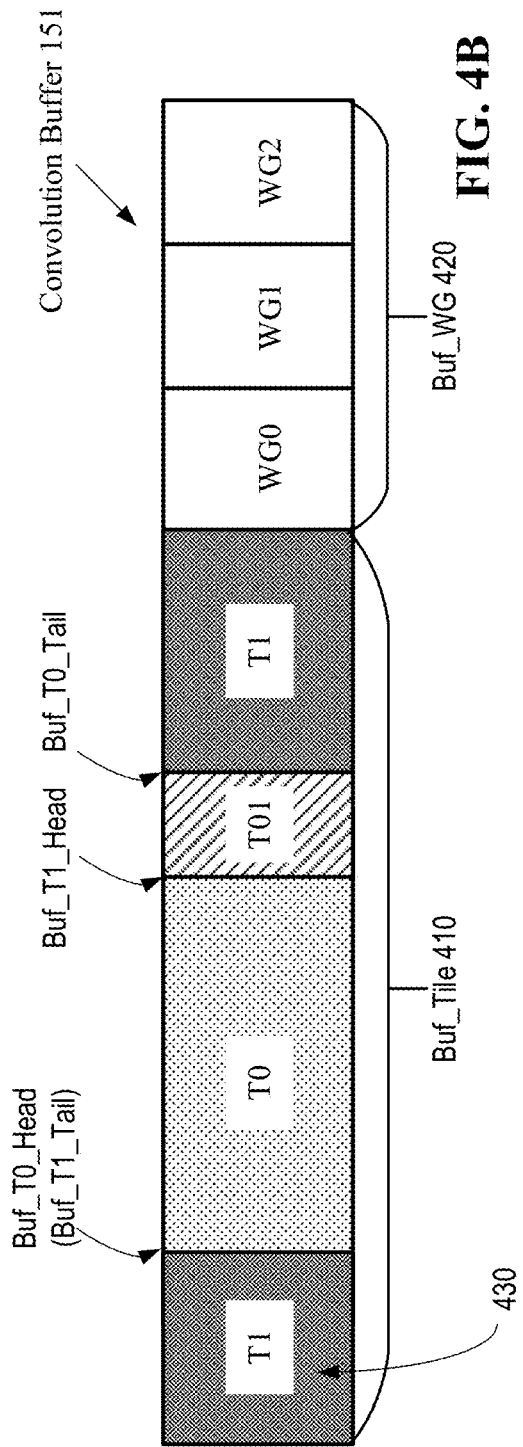

NEURAL NETWORK ENGINE WITH TILE-BASED EXECUTION

CROSS-REFERENCE TO RELATED APPLICATIONS

This application claims the benefit of U.S. Provisional Application No. 62/618,102 filed on Jan. 17, 2018, and U.S. Provisional Application No. 62/621,614 filed on Jan. 25, 2018, the entirety of which is incorporated by reference herein.

TECHNICAL FIELD

Embodiments of the invention relate to neural network computing.

BACKGROUND

Deep learning has gained wide acceptance for its superior performance in the fields of computer vision, speech recognition, natural language processing, bioinformatics, and the like. Deep learning is a branch of machine learning that uses artificial neural networks containing more than one hidden layer. One type of artificial neural network, called a convolutional neural network (CNN), has been used by deep learning over large data sets such as image data.

Neural networks are not only computation-intensive, but also incur heavy memory access. For example, a core computation of neural network computing is convolution. For feature extraction, an input image may be convolved with a set of filters over a set of input channels (e.g., red, green and blue), followed by nonlinear computations, down-sampling computations, and class scores computations. The computations typically incur heavy data access to a system memory external to the processors. Thus, there is a need for improvement in neural network computing to increase system performance.

SUMMARY

In one embodiment, an accelerator is provided for neural network computing. The accelerator includes hardware engines such as a convolution engine and at least a second engine. Each hardware engine includes circuitry to perform neural network operations. The accelerator also includes a buffer memory to store a first input tile and a second input tile of an input feature map. The second input tile overlaps with the first input tile in the buffer memory. The convolution engine is operative to retrieve the first input tile from the buffer memory, perform convolution operations on the first input tile to generate an intermediate tile of an intermediate feature map, and pass the intermediate tile to the second engine via the buffer memory.

In another embodiment, a method performed by an accelerator is provided for neural network computing. The method includes: retrieving, by a convolution engine in the accelerator, a first input tile of an input feature map from a buffer memory within the accelerator; performing convolution operations on the first input tile to generate an intermediate tile of an intermediate feature map; and passing the intermediate tile from the to a second engine in the accelerator via the buffer memory. The buffer memory stores the first input tile and a second input tile which overlaps with the first input tile in the buffer memory.

Advantages of the embodiments will be explained in detail in the following descriptions.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

FIGS. 3A and 3B illustrate examples of overlapped input tiles in an input feature map according to some embodiments.

FIGS. 4A and 4B illustrate stored contents of a convolution buffer according to some embodiments.

DETAILED DESCRIPTION

Figure 1:
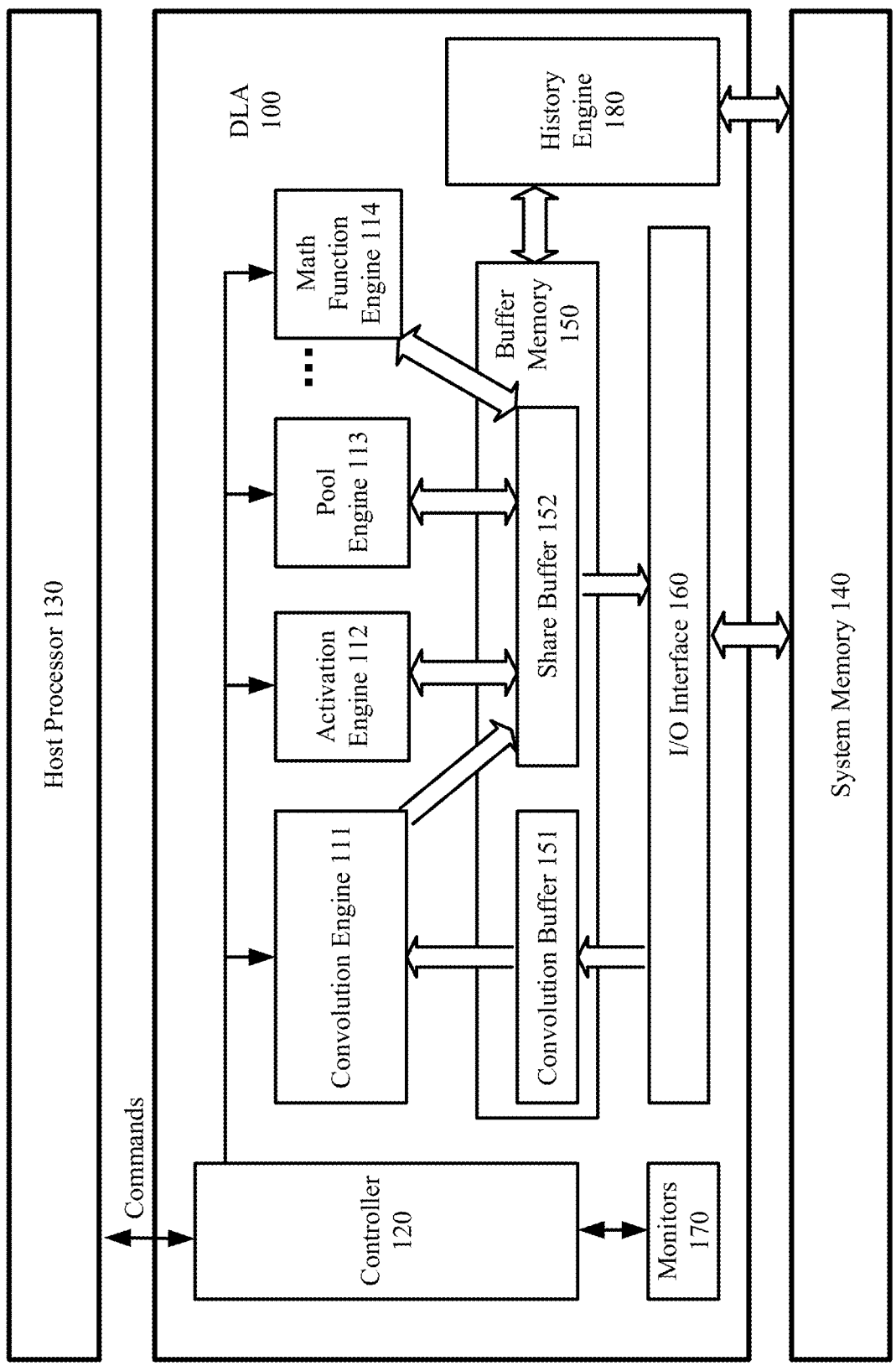
FIG. 1 illustrates an accelerator for neural network computing according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a system and method for managing data reuse and data movement in a neural network processor (also referred to as a deep learning accelerator (DLA)). In one embodiment, input data to the DLA is retrieved from a system memory external to the DLA, and stored in a buffer memory internal to the DLA. Due to the limited buffer size, only a fraction of the input data can be stored in the buffer memory at any given point of time. Thus, the input data may be partitioned into multiple tiles, and the buffer memory may store one or more tiles at the same time.

Neural network processing is composed of a series of layers. At each layer an input feature map is processed into an output feature map by a neural network engine (also referred to as "engine") in the DLA. The DLA includes multiple different engines performing different types of neural network computations. Each engine processes the input feature map on a tile-by-tile basis; that is, each engine processes one tile of the input feature map at a time. For example, a first engine (e.g., a convolution engine) performs operations on a first input tile to produce an output tile, and passes the output tile to a second engine via the buffer memory. The second engine operates on the output tile while the first engine operates on a second input tile. Thus, the engines may process the tiles in parallel, passing data from one engine to another via the buffer memory to reduce system memory access.

In one embodiment, the DLA at runtime may select a tiling scheme and a tile traversal scheme for one or more layers of neural network operations. The tiling scheme specifies a tile size or sizes for tiling an input feature map in the XY plane, and the tile traversal scheme specifies the order of generating tiles in the X, Y and Z dimensions.

In one embodiment, the tiles of an input feature map may overlap with each other. For example, if tiles T0 and T1 overlap, the overlapped portion T01 may be fetched once from the system memory as part of T0, and may stay in the buffer memory for reuse as part of T1. Accordingly, data movement incurred by fetching neighboring tiles from the system memory can be reduced.

In one embodiment, the tiles of an output feature map may overlap with each other. For example, a convolution engine performs convolution on a first input tile to produce a first output tile, and on a second input tile to produce a second output tile. The first and second output tiles may overlap with each other. Thus, in one embodiment, the DLA may store the overlapped portion of the two output tiles such that the overlapped portion is computed only once. In the above example, the convolution engine may compute a non-overlapped portion of the second output tile. Then the non-overlapped portion may be combined with the stored overlapped portion to form the second output tile. Accordingly, the reuse of output data (hereinafter referred to as "cross-tile reuse") may reduce the computation workload of the DLA.

FIG. 1 illustrates a system that includes a DLA 100 for neural network computing according to one embodiment. The DLA 100 is coupled to a host processor 130 (e.g., a central processing unit (CPU), a graphics processing unit (GPU), a digital signal processor (DSP), a media processor, or another general-purpose and/or special-purpose processing circuitry). The DLA 100 is also coupled to a system memory 140 external to the DLA 100. The system memory 140 may include one or more Dynamic Random Access Memory (DRAM) devices, or other volatile or non-volatile memory devices. In FIG. 1, the thick arrows represent data flows (e.g., the flows of input and output feature map data) and the thin arrows represent control flows (e.g., commands, system statistics for control of operations, etc.)

The DLA 100 includes multiple engines, each of which performs one type of neural network operations. Each engine includes hardware circuits (e.g., multipliers, adders, accumulators, etc.) for performing mathematical computations. In this example, the DLA 100 includes a convolution engine 111 for performing convolution operations, an activation engine 112 for performing element-wise mathematical operations (e.g., rectification (ReLU), batch normalization (BN), etc.), a pooling engine 113 for performing down-sampling operations, and a mathematical function engine 114 (e.g., for computing trigonometry functions, max/min functions, absolute values, etc.). The DLA 100 may include additional engines, which are omitted herein to simplify the illustration.

As mentioned before, neural network processing is composed of a series of layers. At each layer, one of the engines performs operations on an input feature map to produce an output feature map. The output feature map of a first engine may become the input feature map of a second engine. Each of these feature maps (which include input feature maps and output feature maps) is a multi-dimensional array, also referred to as a tensor. For example, a feature map may have three dimensions, including width, height and depth. For the purpose of explanations, in the following description the width, height and depth dimensions are assumed to be aligned with X, Y and Z dimensions, respectively.

In one embodiment, the DLA 100 includes a buffer memory 150, which further includes one or more buffers, such as a convolution buffer 151 and a shared buffer 152. The convolution buffer 151 stores input data and filter weights for use by the convolution engine 111, and the shared buffer 152 stores intermediate input and output data for shared access by multiple or all of the engines 111-114. In one embodiment, the buffers 151 and 152 may include Static Random Access Memory (SRAM) devices, or other volatile or non-volatile memory devices.

The DLA 100 also includes a controller 120, which dispatches commands from the host processor 130 to the engines 111-114. According to the commands, the engines 111-114 retrieve input from the buffer memory 150 and performs neural network computations. The DLA 100 loads data from, and stores data to, the system memory 140 via an I/O interface 160. Data loaded from the system memory 140 may be stored in the buffer memory 150 for fast data access. Data is loaded from the system memory 140 according to a tiling scheme and a tile traversal scheme selected by the controller 120 at runtime.

The DLA 100 also includes monitors 170, which may be controlled by the controller 120 to monitor and collect system statistics including the DLA computation load and an amount of data access to the system memory 140 (i.e., the amount of data traffic on the connections between the DLA 100 and the system memory 140). The collected system statistics is sent to the controller 120 for selecting a tiling scheme and a tile traversal scheme, as will be described in detail later. The DLA 100 also includes a history engine 180, which controls the storing and loading of reusable data in the system memory 140 and/or the buffer memory 150.

Figure 2:
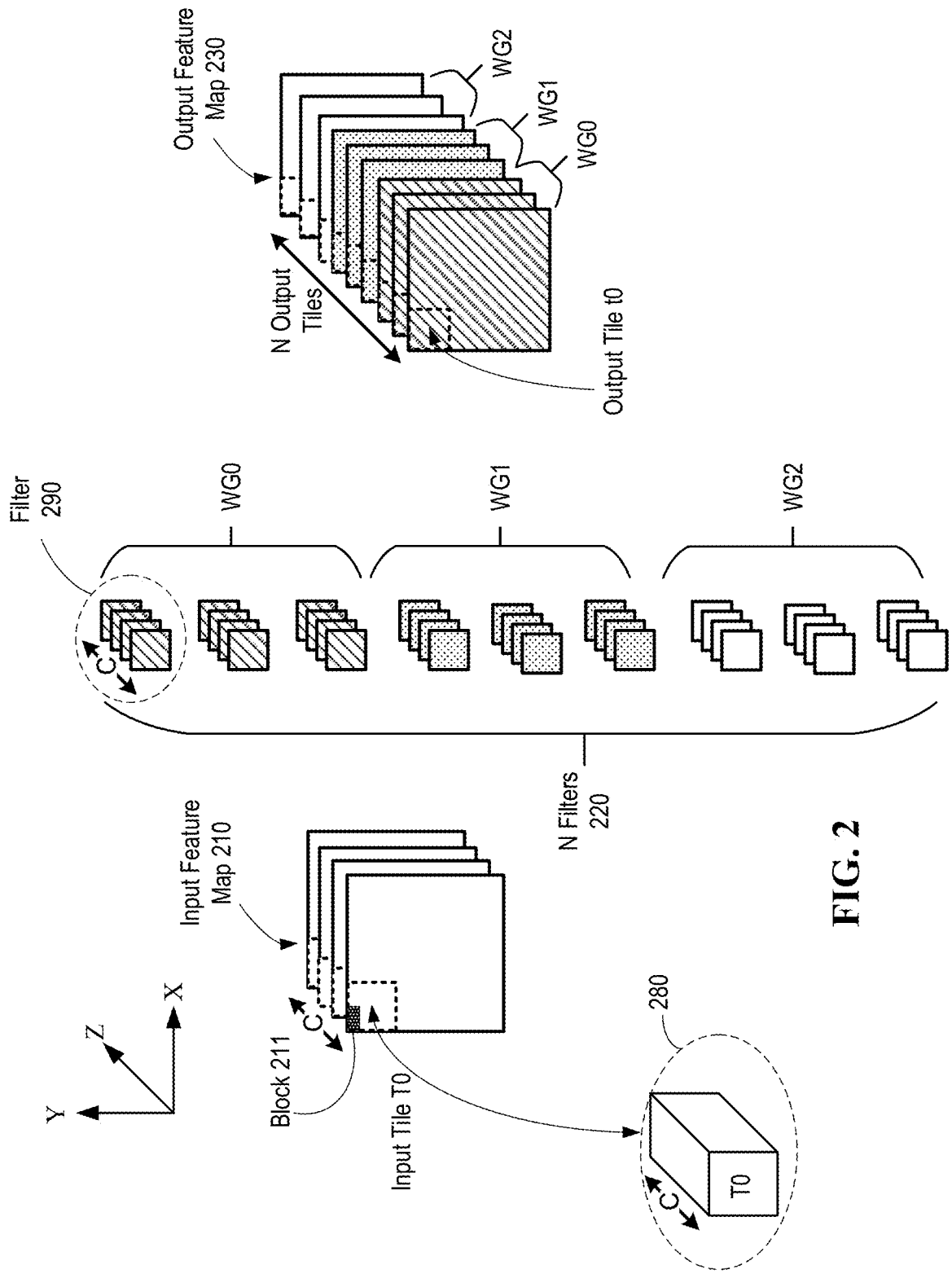
FIG. 2 illustrates an example of convolution operations.

Before describing embodiments of the invention, it is helpful to explain some terminologies used in the convolution operations. FIG. 2 illustrates an example of convolution operations. The convolution engine 111 performs convolution on an input feature map 210 using a set of filters 220. Each filter 220 is typically smaller in height and width than the input feature map. For example, a filter may be composed of 5×5 weights in the XY plane; that is, five weights along the X dimension and five weights along the Y dimension. The input feature map 210 (e.g., an input image) may have hundreds or thousands or more pixels in each of X and Y dimensions. In addition, the input feature map 210 has a depth (Z) dimension having size C, which is equal to the number of channels in the input feature map 210. Each filter 220 has the same number (C) of weights in the Z dimension, or equivalently, each filter 220 is composed of C channels or C depth slices. During a convolution pass, a filter 220 slides across the input feature map 210 in the XY plane, and dot products are computed between the weights and the pixel values at any position. An output feature map 230 is a representation of the filter response at every spatial position of the input image. Convolution with the N filters 220 produces the output feature maps 230 having N depth slices. Each of the N depth slices corresponds to one of the N filters 220. The N filters 220 may be divided into one or more filter groups (or equivalently, weight groups), such as WG0, WG1 and WG2 in the example of FIG. 2. The number of weight groups is the same as the number of Z dimension partitions in the output filter map 230.

The input feature map 210 may be divided into a number of input tiles; e.g., T0 is an input tile. Each input tile (e.g., T0) contains C depth slices. FIG. 2 shows an equivalent representation of T0 (in a dotted circle 280) in the form of a square cuboid or a rectangular cuboid having length C in the Z dimension. For each input tile, the convolution engine 111 applies the N filters 220 to produce corresponding N output tiles; e.g., output tile t0 is the result of applying one filter (e.g., a filter 290) on T0. These corresponding N output tiles are in the respective N depth slices of the output feature map 230.

In one embodiment, the input tiles may overlap with each other, and each tile is divided into equal-sized, non-overlapping blocks. A block (e.g., block 211) is a basic unit of computation. For example, an engine (e.g., the convolution engine 111) may include an array of multiply-and-accumulate (MAC) circuits, and the size of a block may be equal to the size of the MAC array. Thus, operations on a block can be performed in parallel within an engine. The size of an input tile may be determined by the size of the buffer (e.g., the convolution buffer 151). For example, an entire input tile should fit into the convolution buffer 151. In one embodiment, a programmer may run a compiler at design time to determine a number of tile sizes based on the available hardware components and expected characteristics of software applications to be run on the DLA 100.

FIGS. 3A and 3B illustrate examples of overlapped input tiles in an input feature map 310 according to some embodiments. The input feature map 310 may be an input to the convolution engine 111 in FIG. 1. In both examples, the input feature map 310 is partitioned into four overlapping input tiles in the XY plane; e.g., T0-T3. As mentioned before, the convolution engine 111 operates on the input tile, one tile at a time, to generate an output feature map. The convolution engine 111 may traverse the tiles in an input feature map by traversing the X dimension first or the Y dimension first.

FIG. 3A highlights the overlapped portion T01 between T0 and T1 according to one embodiment. If the convolution engine 111 traverses the input tiles in the X dimension first (i.e., in the order of T0, T1, T2, T3), then T01 only needs to be fetched from the system memory 140 once and can be used and reused as part of both T0 and T1 in the convolution computations. FIG. 3B highlights the overlapped portion T02 between T0 and T2. If the convolution engine 111 traverses the input tiles in the Y dimension first (i.e., in the order of T0, T2, T1, T3), then T02 only needs to be fetched from the system memory 140 once and can be used and reused as part of both T0 and T2 in the convolution computations. Although T01 (in FIG. 3A) may also be reused with the Y-dimension-first tile traversal in FIG. 3B, in one embodiment the convolution buffer 151 has limited space and can only store the overlapped portion of consecutively-traversed input tiles. Examples of stored content of the convolution buffer 151 are shown in FIG. 4A and FIG. 4B.

FIGS. 4A and 4B illustrate stored contents of the convolution buffer 151 according to some embodiments. The convolution buffer 151 stores one or more input tiles in Buf_Tile 410 and filter weights in Buf_WG 420 for use by the convolution engine 211. As the input tiles are processed one block at a time, Buf_Tile 410 may be implemented as a ring buffer such that used blocks in a first tile are overwritten by new blocks in a second tile. In FIG. 4A, the convolution buffer 151 stores a first input tile T0 (including the overlapped portion T01) and filter weights in three weight groups (e.g., WG0, WG1 and WG2). The convolution buffer 151 may also store some or all of the non-overlapped portion of a second input tile; e.g., T1, when the X dimension is traversed first using the example of FIG. 3A. Storing T01 in the convolution buffer 151 as part of both T0 and T1 not only saves the buffer space but also reduces data traffic on the system memory bus. When processing T0 block by block, blocks of T1 may be loaded into section 430 in the convolution buffer 151 to overwrite the processed blocks of T0, as shown in FIG. 4B. Alternatively, T1 may be loaded into section 430 when all blocks of T0 has been processed.

The convolution buffer 151 may also store filter weights in weight groups (e.g., WG0, WG1 and WG2). Each weight group contains the weights of a subset of the filters for the convolution operations (e.g., the weights of three filters according to the example in FIG. 2). Each weight group corresponds to a Z dimension partition in the output feature map. Referring back to the example in FIG. 2, the filter weights in WG0 are applied to the input tile T0 to produce a first group of output tiles in the output feature map 230 (i.e., the output tiles in the first three depth slices of the output feature map 230). Similarly, the filter weights in WG1 are applied to the input tile T0 to produce a second group of output tiles, and the filter weights in WG2 are applied to the input tile T0 to produce a third group of output tiles (where each group of output tiles is represented by a different filled pattern or color).

To optimize computation speed, it would be best if all weight groups are loaded into the convolution buffer 151. However, the limited space in the convolution buffer 151 imposes a trade-off between input tile storage and weight group storage. In a first embodiment where all weight groups are stored in the convolution buffer 151, an input tile may be reused for convolution with all the weight groups to generate all output tiles along the Z dimension in the corresponding XY position. Thus, if the convolution proceeds in the Z dimension first, the same input tile may be loaded only once from the system memory 140 into the convolution buffer 151 and the corresponding output tiles can be computed efficiently. In a second embodiment where the convolution engine 111 traverses the input tiles in the XY plane first (e.g., performs convolution between all input tiles and WG0, followed by all input tiles and WG1, and all input tiles and WG2, etc.), then more buffer space may be allocated to the input tiles and less than all weight groups may be stored in the convolution buffer 151.

Thus, the tile traversal scheme may be a factor in determining the relative sizes of input tile storage and weight group storage in the convolution buffer 151. Cross-tile data reuse with respect to convolution output tiles can be more readily exploited when the convolution input tiles are traversed in the XY plane first (i.e., either X dimension first or Y dimension first). For example, the pooling engine 113 can more efficiently reuse the convolution output tiles when the convolution input tiles are traversed in the XY plane first, as in the second embodiment. However, the convolution computations may be performed more efficiently and the input tiles can be better reused when all output tiles along the Z dimension corresponding to an input tile are generated (i.e., when the convolution output tiles are traversed/generated in the Z dimension first), as in the first embodiment. In both the first embodiment and the second embodiment, Buf_Tile 410 may be implemented as a ring buffer regardless the number of weight groups are stored in Buf_WG 420.

In one embodiment, the controller 120 in FIG. 1 may dynamically select, for one or more layers of neural network operations, a tiling scheme and a tile traversal scheme. For example, each convolution layer may use a combination of Lx and Ly as the tiling scheme, where Lx and Ly are the number of tiles in the X and Y dimensions of the input feature map, respectively. The tile traversal scheme specifies the order in which output tiles in an output feature map are generated in the X, Y and Z dimensions. As mentioned above, a neural network designer at design time may run a compiler to determine a number of options. The controller 120 may, at runtime, select one of the options for a neural network layer that provides optimized performance. In one embodiment, the controller 120 may make the selection based on the system statistics collected by the monitors 170 in FIG. 1.

In one embodiment, the monitors 170 in FIG. 1 monitors and collects runtime system statistics, and provides the collected information to the controller 120. The system statistics may include, but are not limited to, computation load of each engine in the DLA 100, the amount of data traffic on the system memory bus, memory latency caused by accessing filter weights, and memory latency caused by accessing tiles. The controller 120 then selects a tiling scheme and a tile traversal scheme accordingly. For example, the controller 120 may choose to reuse weights when memory latency caused by accessing filter weight is longer than a threshold, and may choose to reuse input tiles otherwise.

Figure 5:
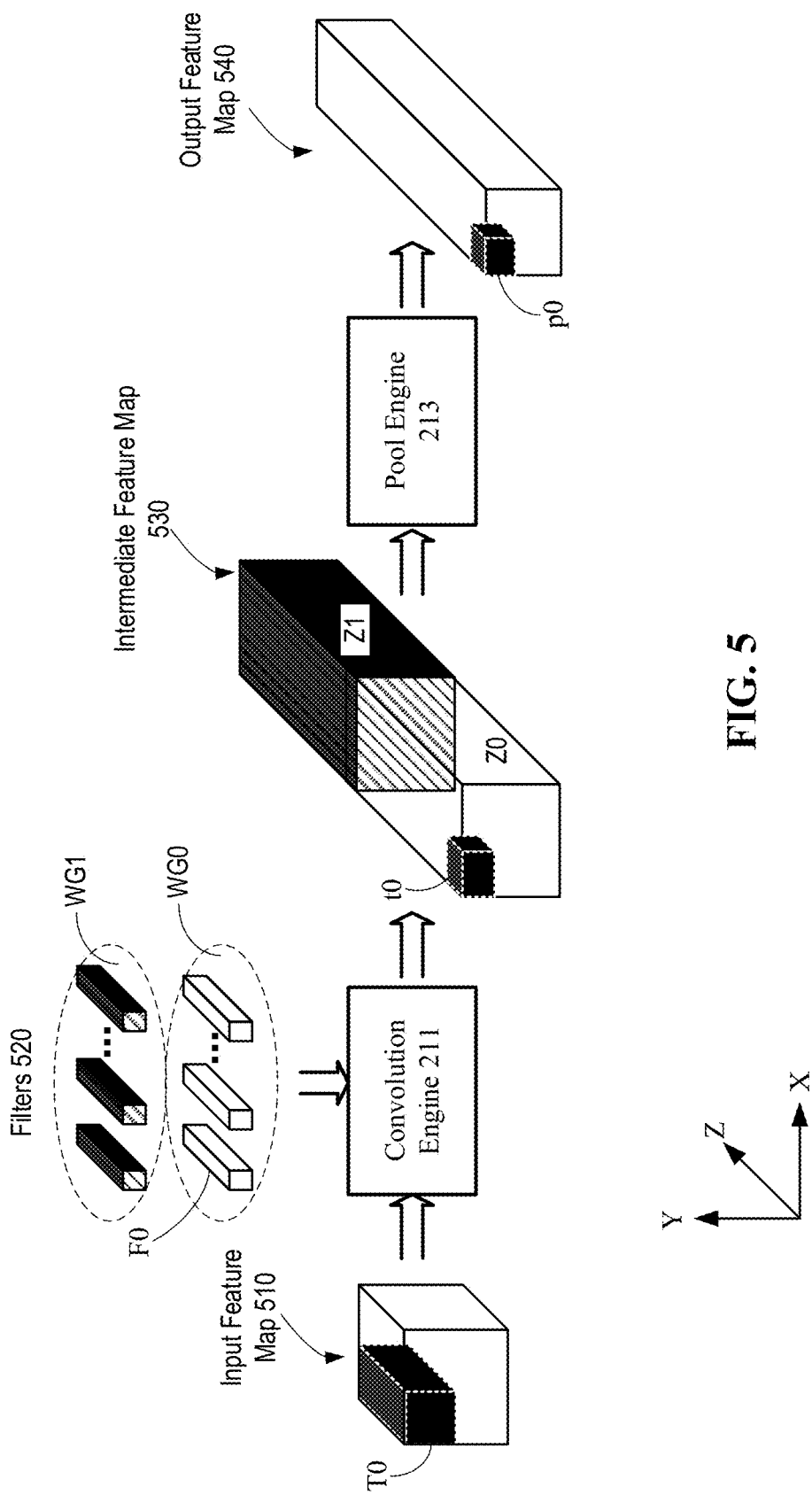
FIG. 5 illustrates an example of an input to a pooling engine according to one embodiment.

FIG. 5 illustrates an example of an input to the pooling engine 113 according to one embodiment. The convolution engine 111 in this example applies filters 520 to an input feature map 510 to produce an output, herein referred to as an intermediate feature map 530 because the convolution output becomes the input to the pooling engine 113. The intermediate feature map 530 has two partitions in the Z dimension: Z0 and Z1, where Z0 and Z1 correspond to convolving the input feature map 510 with weight groups WG0 and WG1, respectively. Each tile in the intermediate feature map 530 (herein referred to as an intermediate tile) is generated by convolving an input tile with one of the filters 520; e.g., t0 is generated by the convolution of input tile T0 with filter F0.

The intermediate tiles in the same XY plane may overlap with each other. The overlapped tile portions can be computed once and reused by other intermediate tiles. The output of the pooling engine 113 is referred to as an output feature map 540. The output tile p0 in the output feature map 540 is a down-sampled version of the intermediate tile t0. In an alternative embodiment, the intermediate feature map 530 may be the output of the activation engine 112, which operates on the output of the convolution engine 111.

Figure 6:
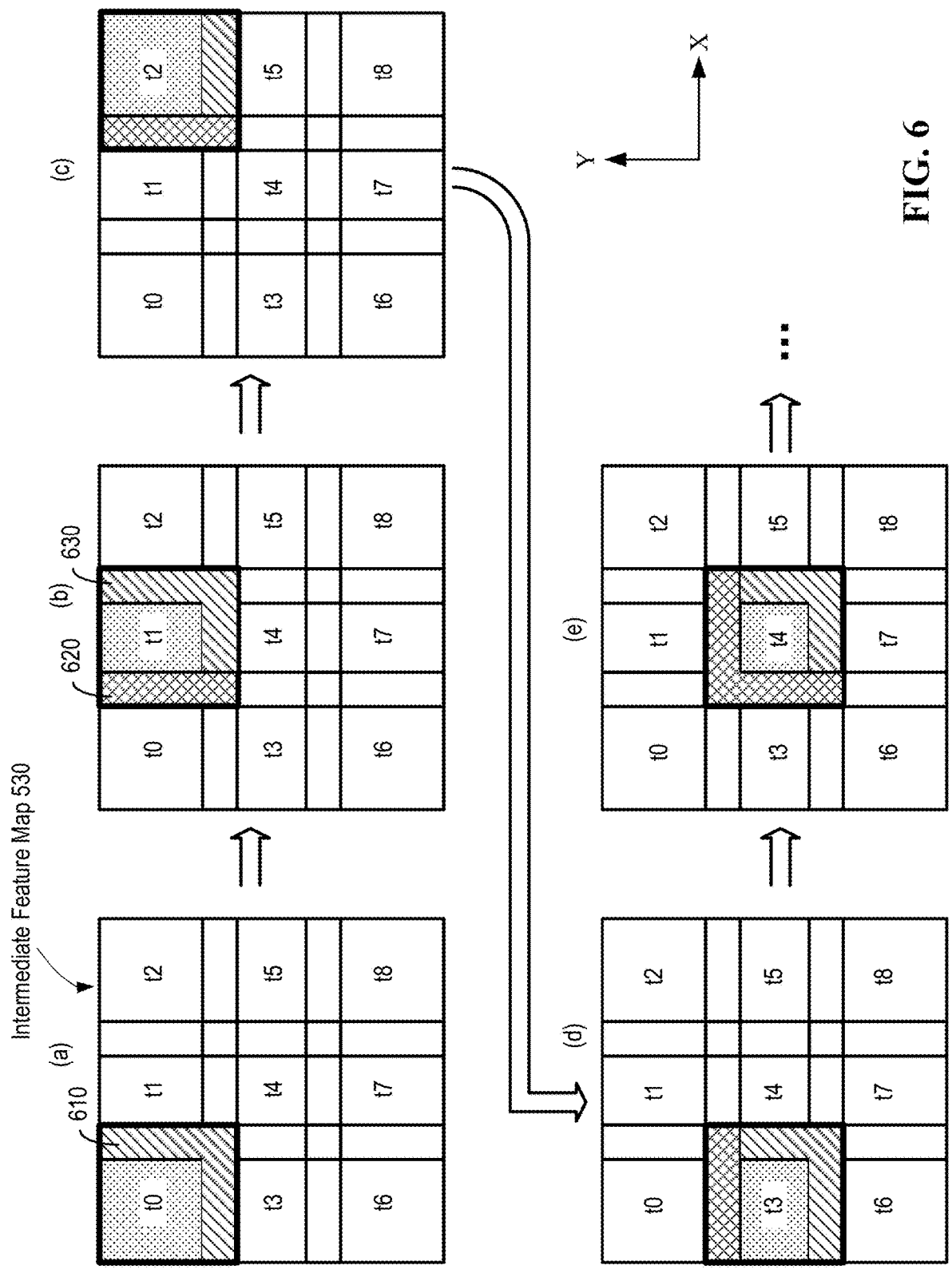
FIG. 6 illustrates an example of cross-tile data reuse for a pooling engine according to one embodiment.

FIG. 6 illustrates an example of cross-tile data reuse in the intermediate feature map 530 according to one embodiment. In this example, the tiles are traversed in the X dimension first, and one depth slice (in the XY plane) of the intermediate feature map 530 is shown to contain nine overlapped tiles t0-t8. Referring also to FIG. 1, when t0 (the upper left square with thick borderlines) is generated in (a) by the convolution engine 111, the history engine 180 flushes (i.e., stores) data 610, which is the portion of t0 that overlaps with t1 and t3 (shown in a slanted line pattern). Data 610 may be stored in a stored location which may be in the shared buffer 152, the system memory 140, or a combination of both. For example, the part of data 610 that overlaps with t1 may be stored in the shared buffer 152 because t1 is processed immediately after t0 by the pooling engine 113, and the part of data 610 that overlaps with t3 may be stored in the system memory 140 because t3 is not processed immediately after t0. The pooling engine 113 then performs pooling operations on t0.

For the pooling engine 113 to perform pooling on t1 in (b), the history engine 180 loads, from the stored location, a first t1 portion 620 that overlaps with t0 (shown in a cross-hatched line pattern). Since the convolution engine 111 has already computed the first t1 portion 620 in (a), it is not necessary for the convolution engine 111 to compute the first t1 portion 620 again in (b). Thus, the convolution engine 111 may compute a reduced-sized t1 (i.e., t1 without the portion 620) to save computation workload. The pooling engine 113 then performs pooling operations on t1, which is formed by combining the reduced-sized t1 and the portion 620. The history engine 180 stores a second t1 portion 630 that overlaps with t2 and t4 (shown in a slanted line pattern) in a stored location for later reuse. Data 610, 620 and 630 are also referred to as boundary tile portions or boundary data. Operations continue with tiles t2-t8 in a similar manner to tiles t0 and t1.

In the example of FIG. 6, for each tile in the intermediate feature map 530 except the first tile (t0) and the last tile (t8) in the order of tile traversal, the history engine 180 performs both load and store. For a given tile, the history engine 180 loads a first set of boundary data of one or more neighboring tiles (i.e., neighbors to the given tile) that have been previously processed by the pooling engine 113. Using t4 as an example of the given tile in (e), the history engine 180 loads a t1 portion and a t3 portion (which, shown in a cross-hatched line pattern, belong to previously-processed tiles t1 and t3, respectively) to form t4 for the pooling engine 113 to perform pooling operations. The history engine 180 stores a second set of boundary data of the given tile for reuse by one or more neighboring tiles (e.g., t5 and t7 when the given tile is t4) that have not been processed by the pooling engine 113. The size of the boundary data may depend on the tile size, the convolution filter size, etc.

Figure 7:
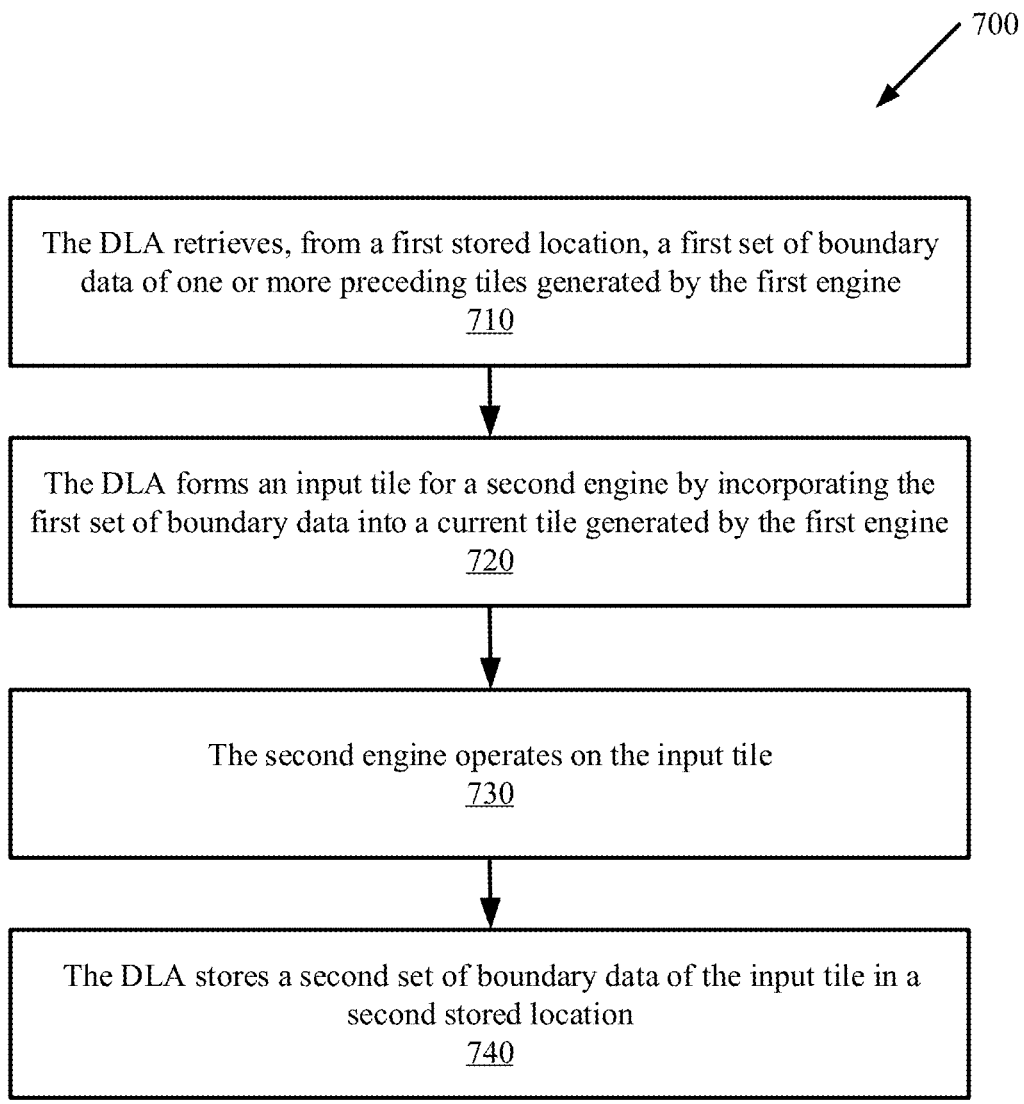
FIG. 7 illustrates a method for performing cross-tile data reuse according to one embodiment.

FIG. 7 is a flow diagram illustrating a method 700 for performing cross-tile data reuse with respect to tiles that are the output of a first engine and input of a second engine in a deep learning accelerator according to one embodiment. In one embodiment, the method 700 may be performed by a neural network processor (e.g., the DLA 100 of FIG. 1).

The method 700 begins when the DLA 100 at step 710 retrieves, from a first stored location, a first set of boundary data of one or more preceding tiles generated by the first engine. The DLA 100 at step 720 forms an input tile for a second engine by incorporating the first set of boundary data into a current tile generated by the first engine. The second engine at step 730 operates on the input tile. The DLA 100 at step 740 stores a second set of boundary data of the input tile in a second stored location. In alternative embodiments, steps 730 may be performed concurrently with, or after, step 740.

The tile size in each feature map may be uniform or non-uniform. In some embodiments, a feature map may contain tiles of different sizes. Tiles across different layers of a neural network may have different sizes. The aforementioned data reuse with respect to input tiles and output tiles is applicable to any tile sizes that are uniform or non-uniform.

Figure 8:
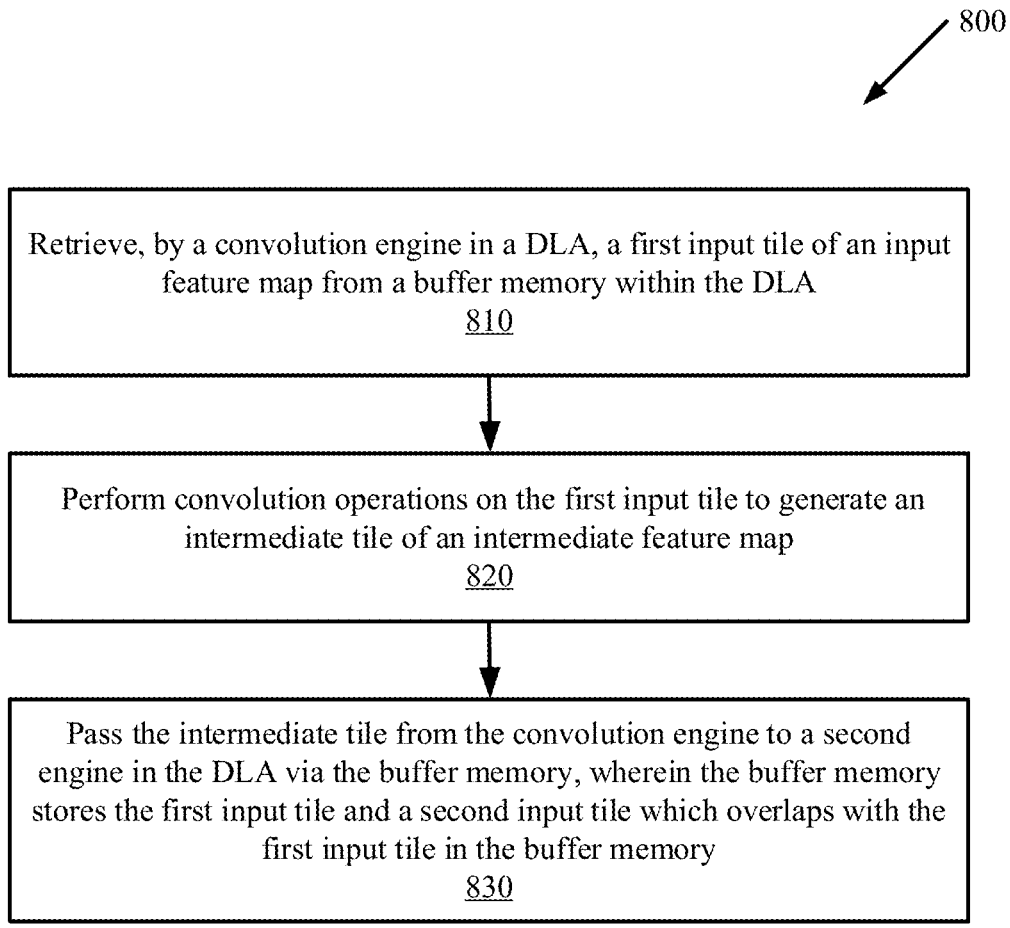
FIG. 8 is a flow diagram illustrating a method for performing tile-based execution of neural network computing according to one embodiment.

FIG. 8 is a flow diagram illustrating a method 800 for performing tile-based execution of neural network computing according to one embodiment. In one embodiment, the method 800 may be performed by a neural network processor (e.g., the DLA 100 of FIG. 1).

The method 800 begins at step 810 when a convolution engine in the DLA retrieves a first input tile of an input feature map from a buffer memory within the DLA. The convolution engine at step 820 performs convolution operations on the first input tile to generate an intermediate tile of an intermediate feature map. The convolution engine at step 830 passes the intermediate tile to a second engine in the DLA via the buffer memory. The buffer memory stores the first input tile and a second input tile which overlaps with the first input tile in the buffer memory. In one embodiment, the second engine performs second operations on the intermediate tile while the convolution engine performs the convolution operations on a second input tile of the input feature map. In one embodiment, the second engine performs second operations on the intermediate tile concurrently with the convolution engine performing the convolution operations on the second input tile of the input feature map.

In one embodiment, a non-transitory computer-readable medium stores thereon instructions that, when executed on one or more processors of a system, cause the system to perform the method 700 of FIG. 7 and the method 800 of FIG. 8. An example of the system has been described above with reference to FIG. 1.

The operations of the flow diagrams of FIGS. 7 and 8 have been described with reference to the exemplary embodiment of FIG. 1 However, it should be understood that the operations of the flow diagrams of FIGS. 7 and 8 can be performed by embodiments of the invention other than the embodiment discussed with reference to FIG. 1, and the embodiment discussed with reference to FIG. 1 can perform operations different than those discussed with reference to the flow diagrams. While the flow diagrams of Figures land 8 show a particular order of operations performed by certain embodiments of the invention, it should be understood that such order is exemplary (e.g., alternative embodiments may perform the operations in a different order, combine certain operations, overlap certain operations, etc.).

Various functional components or blocks have been described herein. As will be appreciated by persons skilled in the art, the functional blocks will preferably be implemented through circuits (either dedicated circuits, or general purpose circuits, which operate under the control of one or more processors and coded instructions), which will typically comprise transistors that are configured in such a way as to control the operation of the circuitry in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. An accelerator for neural network computing, comprising:
   a plurality of hardware engines including a convolution engine and at least a second engine, each hardware engine including circuitry to perform neural network operations; and
   a buffer memory within the accelerator to store a first input tile and a second input tile of an input feature map, wherein the second input tile overlaps with the first input tile in the buffer memory;
   wherein the convolution engine is operative to retrieve the first input tile from the buffer memory, perform convolution operations on the first input tile to generate an intermediate tile of an intermediate feature map, and pass the intermediate tile to the second engine via the buffer memory.

2. The accelerator of claim 1, wherein the second engine is operative to perform second operations on the intermediate tile while the convolution engine performs the convolution operations on the second input tile.

3. The accelerator of claim 1, wherein the buffer memory includes a convolution buffer for access by the convolution engine to retrieve input, the convolution buffer including a first section for storing one or more input tiles of the input feature map, and a second section for storing one or more groups of filter weights for the convolution operations.

4. The accelerator of claim 3, wherein the first section of the convolution buffer is a ring buffer.

5. The accelerator of claim 1, further comprising:
   a history engine operative to:
   load first boundary data of one or more first neighboring tiles to thereby form a given tile as input to the second engine, and
   store second boundary data of the given tile for reuse as part of one or more second neighboring tiles,
   wherein the given tile overlaps with the one or more first neighboring tiles and the one or more second neighboring tiles, the one or more first neighboring tiles have been previously processed by the second engine, and the one or more second neighboring tiles have not been processed by the second engine.

6. The accelerator of claim 5, wherein the given tile is part of the intermediate feature map generated by the convolution engine, and the second engine is a pooling engine operative to perform pooling operations on the intermediate feature map.

7. The accelerator of claim 5, wherein the hardware engines further include an activation engine operative to perform element-wise mathematical computations, and wherein the given tile is part of an output feature map generated by the activation engine, and the second engine is a pooling engine operative to perform pooling operations on the output feature map.

8. The accelerator of claim 1, wherein one or more of the input feature map and the intermediate feature map contain tiles of non-uniform sizes.

9. The accelerator of claim 1, further comprising:
   monitors to monitor and collect system statistics including computation load of the accelerator and an amount of data access to a system memory coupled to the accelerator; and
   a controller to select a tiling scheme which specifies a tile size or sizes for tiling the input feature map in an XY plane based on the collected system statistics.

10. The accelerator of claim 9, wherein the controller is further operative to select a tile traversal scheme which specifies an order of generating tiles in X, Y and Z dimensions based on the collected system statistics.

11. The accelerator of claim 10, wherein the controller is further operative to select the tiling scheme and the tile traversal scheme at runtime for one or more layers of the neural network operations.

12. A method performed by an accelerator for neural network computing, comprising:
   retrieving, by a convolution engine in the accelerator, a first input tile of an input feature map from a buffer memory within the accelerator;
   performing convolution operations on the first input tile to generate an intermediate tile of an intermediate feature map; and passing the intermediate tile to a second engine in the accelerator via the buffer memory, wherein the buffer memory stores the first input tile and a second input tile which overlap with the first input tile in the buffer memory.

13. The method of claim 12, further comprising:

performing, by the second engine, second operations on the intermediate tile while the convolution engine performs the convolution operations on a second input tile of the input feature map.

14. The method of claim 12, wherein the buffer memory includes a convolution buffer for access by the convolution engine to retrieve input, the convolution buffer including a first section for storing one or more input tiles of the input feature map, and a second section for storing one or more groups of filter weights for the convolution operations.

15. The method of claim 14, wherein the first section of the convolution buffer is a ring buffer.

16. The method of claim 12, further comprising:

loading first boundary data of one or more first neighboring tiles to thereby form a given tile as input to the second engine; and storing second boundary data of the given tile for reuse as part of one or more second neighboring tiles, wherein the given tile overlaps with the one or more first neighboring tiles and the one or more second neighboring tiles, the one or more first neighboring tiles have been previously processed by the second engine, and the one or more second neighboring tiles have not been processed by the second engine.

17. The method of claim 16, wherein the given tile is part of the intermediate feature map generated by the convolution engine, and the second engine is a pooling engine operative to perform pooling operations on the intermediate feature map.

18. The method of claim 16, wherein the given tile is part of an output feature map generated by an activation engine operative to perform element-wise mathematical computations, and the second engine is a pooling engine operative to perform pooling operations on the output feature map.

19. The method of claim 12, wherein one or more of the input feature map and the intermediate feature map contain tiles of non-uniform sizes.

20. The method of claim 12, further comprising:

monitoring and collecting system statistics including computation load of the accelerator and an amount of data access to a system memory coupled to the accelerator; and selecting a tiling scheme which specifies a tile size or sizes for tiling the input feature map in an XY plane based on the collected system statistics.

21. The method of claim 20, further comprising:

selecting a tile traversal scheme which specifies an order of generating tiles in X, Y and Z dimensions based on the collected system statistics.

22. The method of claim 21, wherein the tiling scheme and the tile traversal scheme are selected at runtime for one or more layers of the neural network operations.

* * * * *